Patented July 18, 1939

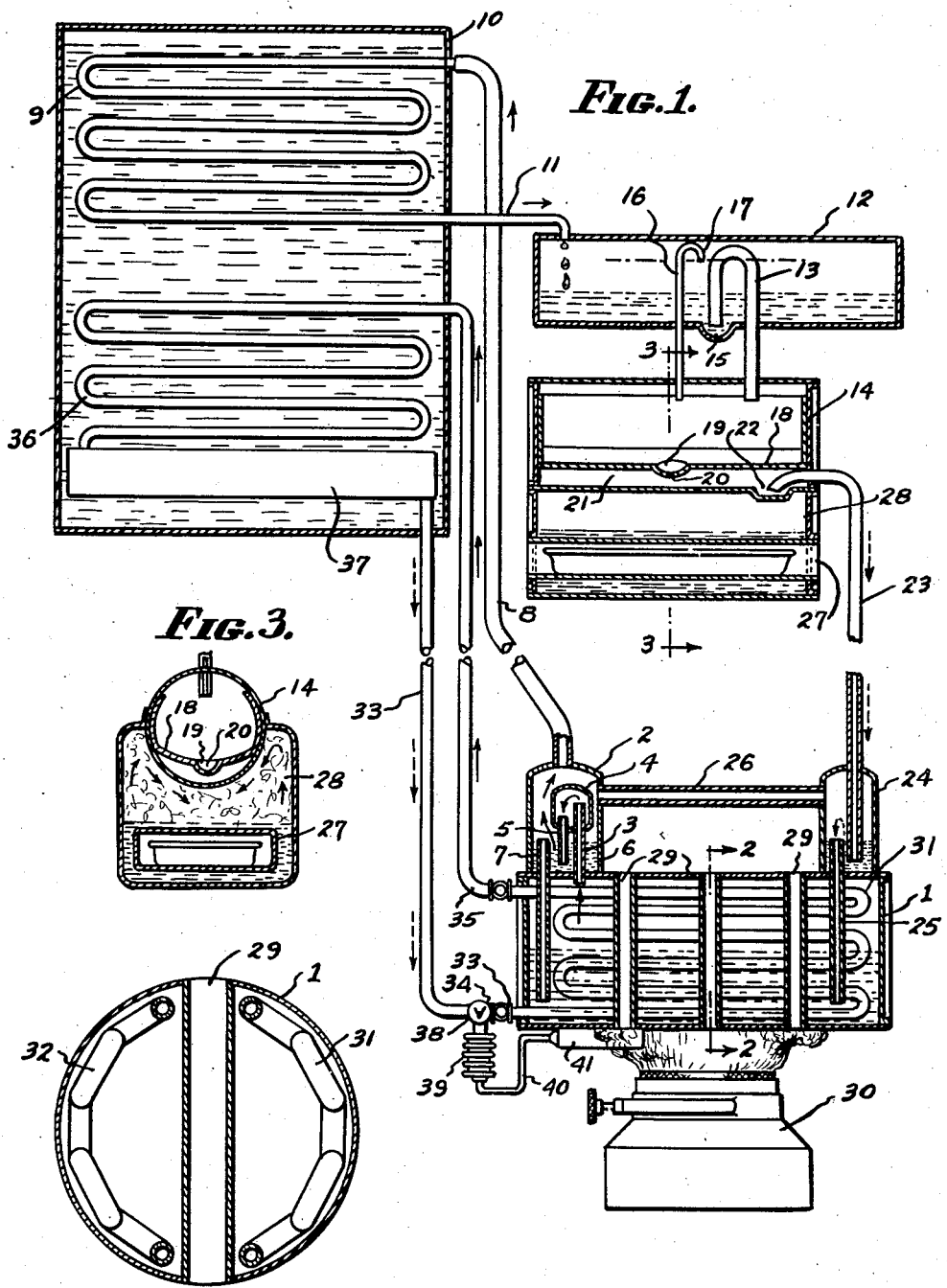

2,166,677

UNITED STATES PATENT OFFICE 2,166,677

REFRIGERATING APPARATUS

John A. Conrady, Cincinnati, Ohio, assignor to The Crosley Corporation, Cincinnati, Ohio, a corporation of Ohio Application March 10, 1937, Serial No. 130,137

5 Claims. (Cl. 62—118)

My invention relates specifically to the "generator absorber" in refrigerating apparatus of the intermittent absorption type.

In refrigerating apparatus operative on the intermittent absorption principle, a refrigerant such as ammonia is employed and an absorbent such as water. The strong liquor or concentrated solution of ammonia in the water is boiled in a vessel commonly called a generator. This same vessel usually functions as an absorber. Heat is applied during the heating cycle to cause the boiling off of the refrigerant. The refrigerant, in gaseous form, passes under pressure to a condensor and receiver in which the gaseous refrigerant is condensed to a liquid and, pending its use during the evaporation cycle, stored. Toward the end of the heating cycle the liquefied refrigerant is transferred from the receiver to the inner shell of the evaporator in which the expansion of the refrigerant to gaseous condition takes up heat which induces such cooling as is required for freezing ice cubes and generally cooling the cooling chambers of the refrigerator.

In some apparatus of the intermittent absorption type the receiver acts also as the evaporator, but in the particular combination with which I shall describe my invention, the receiver is a vessel separate from the evaporator.

It is an object of my invention to provide apparatus and a method for setting up a secondary circulation of water or other cooling liquid through coils in the generator absorber which reduces the temperature of the weak liquor and consequently the pressure of the gaseous refrigerant within the system.

It is a further object of my invention to control the circulation of the cooling water in the generator absorber so that it automatically functions at the close of a generating cycle.

A still further object of my invention, in connection with the cooling of the weak liquor in the generator absorber because of its effect on the pressure within the system, is to reduce the temperature of the weak liquor so that it becomes more effective in its absorbing properties.

Another object is the construction of a generator absorber of a novel type which permits great efficiency when heat is applied thereto and which also permits the positioning of coils therein which are adequately responsive to the establishment of thermo syphon cooling systems in the water coils in the generator absorber as induced by a thermostatic control.

The above objects and other objects relating to such novel features as exist in the construction and arrangement of parts which will be described are accomplished in the apparatus illustrated.

Figure 1 is a diagrammatic sectional view of the refrigerating apparatus illustrating my invention.

Fig. 2 is a sectional view along the lines 2—2 of Fig. 1.

Fig. 3 is a section along line 3—3 of Fig. 1.

The generator absorber is illustrated at 1. At one end of the generator absorber, there is a dome 2 containing the usual rectifying apparatus. A tube 3 permits the gasified ammonia and liquor entrained therewith to pass into the drum 4. From the drum 4, a tube 5 provides an outlet for the evaporated gases which pass upwardly through the entrained liquor trapped in the dome. An overflow 7 drains the dome 2 after the entrained liquor has filled up the dome to the level of the top of the tube 7. The overflow through the tube 7 drains back into the still absorbent.

The apparatus also acts as a separator for the gasified refrigerant.

From the top of the dome 2, a tube 8 passes to the condenser coil 9 which is shown as arranged in a tank 10, cooled with some cooling liquid such as water.

A tube 11 is connected to the discharge or outlet from the condenser coil 9 and this drains the condensed fluid into the receiver 12.

In the receiver 12 there is a return bent tube 13 through which the condensed refrigerant passes to the evaporator 14.

To prevent the liquor being forced by pressure from the sump 15 into the evaporator 14, I have provided a pressure relief tube 16 having an inlet 17 at the top of the tube. Pressure is equalized between the receiver 12 and the evaporator 14 by means of the tube 16 until the level of condensed refrigerant, indicated in dotted lines in Fig. 1, has reached the inlet 17 to the tube 16. Then when the inlet 17 of the tube 16 is sealed, the liquor is forced by the pressure in the receiver 12 into the evaporator 14.

After the receiver 12 has been filled to the level of the inlet 17 and has started to syphon into the evaporator, the syphoning action continues until substantially all the condensed refrigerant in the receiver 12 has syphoned over into the evaporator.

The evaporator 14 has a false bottom 18 having a sump 19 at a low point therein. The small opening 20 permits the condensed liquid to feed either in a very fine string or drop by drop into the evaporating chamber 21 which is formed by the space in the evaporator 14 below the false bottom plate 18. The bottom of the evaporator 14 has a sump 22 from which a tube 23 permits the expanded gas and unexpanded liquor to pass down through the tube 23 into another dome 24 arranged at the end of the generator opposite the dome 2.

A tube 25 drains the condensed refrigerant which passes down the pipe 23 back into the generator absorber.

During normal operation, there will be some entrainment of unevaporated refrigerant through the pipe 23 into the dome 24, but such unevaporated refrigerant will fill in the dome 24 to the level of the top of the tube 25 and as soon as any additional refrigerant is entrained, it will be returned to the weak liquor in the generator 1.

A pressure equalizing tube 26 connects the dome 24 with the dome 2. This prevents the building up of too much pressure on the pressure side of the system.

The ice-cube chamber, as indicated at 27, is formed by a rectangular shell which is set into the end walls of the compartment 28, the end joints being preferably formed by a welding operation.

The compartment 28 is secured to the evaporator 14 so that the walls thereof are welded to the evaporator in substantially the position illustrated in Fig. 3. Consequently the lower half of the evaporator 14 is set into the top wall of the compartment 28.

Within the compartment 28 a secondary refrigerating system is set up. A preferred refrigerant is sulphur dioxide. During the generating cycle, the evaporator 14 becomes warm. The lower wall, were it not for the presence of the sulphur dioxide, instead of a common brine solution such as calcium chloride and water, etc., rapidly exchanges its heat to the walls of the cooling compartment 27. As the sulphur dioxide gas is warmed up, the warm gas rises to the top of the compartment 28 and acts as an effective insulator, and an atmosphere of cool sulphur dioxide liquid remains in the lower portion of the compartment 28 which prevents heat being transferred from the evaporator to the $SO_2$ brine and in so doing helps to prevent the melting of ice cubes during heating cycle.

During the evaporating cycle, the condensed refrigerant, ammonia, drips through the small opening 20 and evaporates in the chamber. This action chills the lower wall of the evaporator. The sulphur dioxide coming into contact with the chilled lower wall of the evaporator will be condensed into liquid form and drip down and strike the liquid above the top wall of the chamber 27. The liquefied sulphur dioxide spread out in a thin film, will begin to evaporate thereby taking heat from the walls of the chamber 27. This will start a circulation of the cold gasses downward and the hot gasses will pass up in the direction of the arrows illustrated.

It may be that the exact action which I have described will not occur. In any event, the chilled bottom wall of the evaporator 14 will cause a circulation of the sulphur dioxide gas, the cold gas passing down and striking the top wall of the chamber 27 and the warm gas passing up along the outer walls of the chamber 28.

So far the description of my invention coincides with that of my co-pending application Ser. No. 130,136, filed March 10, 1937. This application involves particularly the specific construction of the generator absorber and the thermo syphon automatically controlled water coil system for cooling the generator.

The generator absorber 1 is provided with a series of fire tubes 29 through which the hot gasses pass from the fuel burner 30 which, as illustrated, may be an oil burner with a fuel such as kerosene. With such a system the quantity of kerosene or other fuel oil received within the well of the burner may be such that a complete generating cycle will be induced before the liquid fuel is consumed. Thus by filling the well in the burner, lighting the wick and permitting all the fuel to burn out, sufficient refrigerant will be evaporated to run the system for 24 hours, or shorter length of time. Regulation of the amount of heat applied will in this way be semi-automatic because only enough fuel will be supplied to complete the generating cycle.

Arranged within the generator 1 are two sets of coils 31, 32. The inlet to these coils is at the bottom where elbows 33 and short nipples, not illustrated, extend into a cross, not illustrated, to which the pipe 34 is connected. This manner of connecting two pipes into one is so well known in pipe fitting practice, as to not require further description.

The same arrangement of elbows and a cross is provided for the discharge from the top ends of the two coils 31, 32 the pipe 35 being connected to the outlet from the cross.

In the tank 10, which is filled with water, I have arranged a coil 36 with a header chamber 37 at the bottom of the coil. The outlet pipe 33 connects the header with the bottom inlets to the two coils 31, 32. The inlet to the top of the coil 36 is from the pipe 35 which connects the outlets at the tops of the two coils 31, 32.

In the pipe 33, I have arranged a valve 38 which is opened and closed by means of the action of the bellows 39. The bellows are filled with liquid or gas supplied through a pipe 40 from the small tank 41.

The operation of the thermo syphon cooling system for the generator absorber will be obvious from the description of the apparatus. During the interval when the fuel burner is in operation the liquid or gas in the small tank 41 will expand and create pressure in the pipe 40 which will expand the bellows 39 and close the valve 38, so that no water can flow through the pipe 33 into the bottom inlets of the two coils 31, 32. As soon as the fuel is exhausted in the fuel burner or controlled in such a way as to be shut off, the liquid or gas in the small tank 41 will cool and induce the contraction of the bellows 39 which will cause the valve 38 to open. When the valve 38 is open, water will flow down through the pipe 33 into the inlets at the lower ends of the coils 31, 32 and pass up through the outlet 35 to the coil 36. Thus a thermo syphon water cooling system will be started, which will continue until such time as the fuel burner is again ignited.

Having thus described my invention, what I claim as new and desire to secure by Letters Patent, is:

1. In refrigerating apparatus of the intermittent absorption type having a refrigerant condenser and cooling means therefor, a generator absorber having water circulation coils therein, a supply of cooling water arranged to be cooled by the cooling means for the condenser, and means for intermittently inducing thermo syphon circulation of water from said cooling water supply through said water circulating coils.

2. In refrigerating apparatus of the intermittent absorption type having a refrigerant condenser and cooling means therefor, a generator absorber having water circulation coils therein, a supply of cooling water arranged to be cooled by the cooling means for the condenser, and means for intermittently inducing thermo syphon circulation of water from said cooling water supply through said water circulating coils and a thermostatic control for cutting off said water circulation during periods of generation in said generator absorber.

3. In refrigerating apparatus of the intermittent absorption type having a refrigerant condenser and cooling means therefor, a generator absorber having water circulation coils therein, a supply of cooling water arranged to be cooled by the cooling means for the condenser, and means for intermittently inducing thermo syphon circulation of water from said cooling water supply through said water circulating coils and a thermostatic control for cutting off said water circulation during periods of generation in said generator absorber, said thermostatic control effective for inhibiting the thermostatic cut off at the end of a generating period.

4. In refrigerating apparatus of the intermittent absorption type a generator absorber, a plurality of coils having inlets at the bottom of said generator absorber and outlets at the top thereof, and means for setting up a thermo syphon system of cool water circulation through said coils.

5. In refrigerating apparatus of the intermittent absorption type a generator absorber, a plurality of coils having inlets at the bottom of said generator absorber and outlets at the top thereof, and means for setting up a thermo syphon system of cool water circulation through said coils and thermal means effective during generation periods in said apparatus for cutting off the circulation of water through said coils.

JOHN A. CONRADY.